United States Patent [19]
Nazri

[11] Patent Number: 4,826,743
[45] Date of Patent: May 2, 1989

[54] SOLID-STATE LITHIUM BATTERY

[75] Inventor: Gholamabbas Nazri, Bloomfield Hills, Mich.

[73] Assignee: General Motors Corporation, Detroit, Mich.

[21] Appl. No.: 134,110

[22] Filed: Dec. 16, 1987

[51] Int. Cl.$^4$ ............................................. H01M 6/18
[52] U.S. Cl. ................................... 429/191; 252/62.2
[58] Field of Search ....................... 429/188, 191, 194; 252/62.2

[56] References Cited

U.S. PATENT DOCUMENTS

| | | | |
|---|---|---|---|
| 3,615,828 | 10/1971 | Fischer | 429/199 X |
| 4,074,019 | 2/1978 | Malachesky et al. | 429/191 X |
| 4,461,816 | 7/1984 | Leribaux | 429/191 |

FOREIGN PATENT DOCUMENTS 2039864  5/1983  United Kingdom .

OTHER PUBLICATIONS

Vashishta et al., eds., *Fast Ion Transport in Solids*, New York, N.Y., 1979, pp. 17–22, 527–533.
Mahan et al., eds., *Superionic Conductors*, Plenum Press, N.Y., 1976, pp. 1–15.
Aceves et al., *J. Appl. Electrrochemistry*, V. 10, pp. 379–384, 1980.
Owens et al., *Top. Appl. Physics*, V. 21, pp. 67–104, 1977.
Suryanarayana et al., *Bulletin of Electrochemistry*, vol. 2, pp. 49–52, 1986.
Steele, *Chemistry and Industry*, Oct. 6, 1986, pp. 651–656.
Sekido, *Solid State Ionics*, V. 9&10, 1977, pp. 777–782.
Salamon, *Top. Current Physics*, vol. 15, pp. 175–199, 1979.
Rice et al., *J. Solid State Chemistry*, vol. 4, pp. 294–310 (1972).
Hagenmuller et al., *Solid Electrolytes*, Academic Press, N.Y., 1978, pp. 9–26.
Horne et al., the Physics of Superionic Conductors and Electrode Materials, NATO ASI Series B: Physics, V. 92, Plenum Press, N.Y., 1978, pp. 257–277.
Van Gool et al., *J. Solid State Chemistry*, vol. 7, pp. 59–65, 1973.
Ratner, *Acc. Chem. Res.*, vol. 15, pp. 355–361, 1982.
Rahman et al., *The Physics of Supersonic Connectors and Electrode Materials*, NATO ASI Series B, vol. 92, pp. 93–142, 1978, Adams, *The Physics of SuperIonic* . . . , p. 177.
Rabenau et al., *J. Less-Common Metals*, V. 50, pp. 155–159, 1976.
Schulz et al., *Fast Ion Transport in Solids*, New York, N.Y. 1979, North-Holland, pp. 495–498.
Wolf et al., *J. Physics. C: Solid State Physics*, vol. 17, pp. 6623–6634, 1984.
O'Hare et al., *J. Chem. Thermodynamics*, vol. 7, pp. 13–20, 1975.
Burger, *Contemporary Crystallography*, McGraw-Hill Book Co., N.Y., 1970, pp. 81–103, 202–228.
Duffy, *J. Physics C: Solid State Physics*, vol. 19, pp. 4393–4412, 1986.
Boukamp et al., *Mat. Res. Bull.*, V. 13, pp. 23–32, 1978.
Schulz et al., *ACTA Cryst.*, vol. A35, pp. 309–314, 1979.
Nazri, unpublished paper, "Preparation ANF (sic) Characterization of Lithium Phosphide, a New Superionic Conductor for Advanced Batteries".

*Primary Examiner*—Stephen J. Kalafut
*Attorney, Agent, or Firm*—Lawrence B. Plant

[57] ABSTRACT

A solid-state, lithium battery having an electrolyte comprising trilithium phosphide.

2 Claims, 2 Drawing Sheets

SOLID-STATE LITHIUM BATTERY

This invention relates to a solid-state, lithium galvanic cell (i.e., battery) and more particularly to a unique, superconductive, solid-state electrolyte therefor.

BACKGROUND OF THE INVENTION

So-called "lithium" batteries are known in the art and take a variety of forms. Typically they include essentially: an electrode (i.e., anode) comprising lithium or alloys thereof (e.g., Li-Al); a lithium ion conducting electrolyte; and a counter-electrode (i.e., cathode) comprising any of a number of materials such as titanium disulfide, molybdenum disulfide, manganese dioxide, or vanadium oxide ($V_6O_{13}$). As used herein, the term "lithium" is intended to include not only pure lithium but alloys thereof useful in lithium batteries. High temperature (i.e., Ca. 300° C.) lithium batteries often use so-called glassy electrolytes comprising various oxide mixtures such as (1) lithium oxide and aluminum oxide, 2) lithium oxide and silicon dioxide, (3) lithium oxide, silicon dioxide and zirconium oxide or (4) lithium oxide, silicon dioxide and phosphorous oxide ($PO_3$). Moderate temperature (i.e., Ca. 100° C.) lithium batteries may use a viscous polymer electrolyte such as (1) lithium perchlorate dissolved in polyethylene oxide or (2) 2-2-methoxy-ethoxy-ethoxypolyphosphazene (i.e., aka MEEP). A known room temperature lithium battery uses a non-aqueous, liquid organic electrolyte comprising lithium salt dissolved in propylene carbonate. None of the aforesaid batteries utilize a solid-state electrolyte and their operating temperatures and/or liquid electrolyte limits their usefulness.

A solid-state, lithium battery has been suggested which utilizes lithium nitride as the electrolyte. Unfortunately, lithium nitride has relatively low ion transport properties at room temperatures and electrochemically decomposes when cell voltages exceed about 0.4 volts. Hence not only are lithium nitride cells current limited but can only be made with cathode materials which yield cell voltages less than the 0.4 volts decomposition voltage. This latter limitation eliminates the aforesaid more popular cathode materials all of which yield significantly higher cell voltages. Higher voltages are, of course, more desirable for most applications.

It is an object of the present invention to provide a lithium battery having a unique, solid-state electrolyte which not only has high room temperature ionic conductivity but which is electrochemically stable against decomposition at relatively high cell voltages. This and other objects and advantages of the present invention will become more readily apparent from the detailed description thereof which follows and which is given hereafter in conjunction with the several drawings in which:

THE INVENTION

Figure 1:
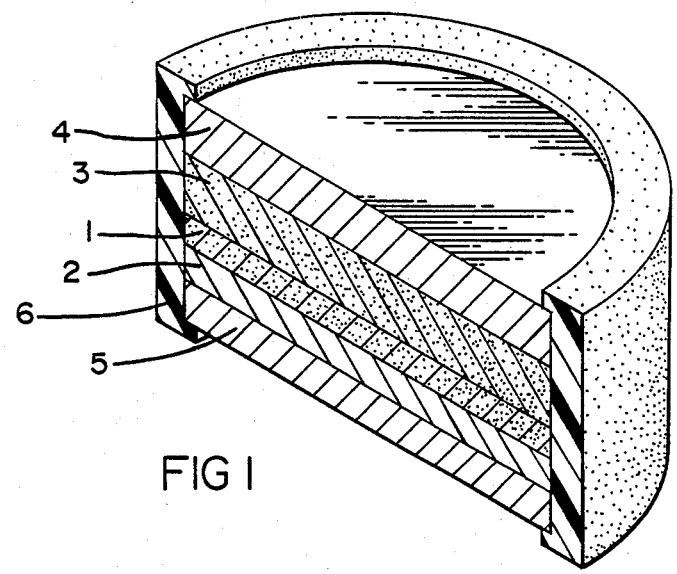
FIG. 1 is a sectioned perspective view of a solid-state, lithium battery in accordance with the present invention.

The present invention comprehends a secondary, solid-state, room temperature lithium battery comprising a lithium electrode, a counterelectrode and a trilithium phosphide ($Li_3P$) solid-state electrolyte having high lithium ion conductivity and electrochemical stability at cell voltages significantly higher than 0.4 volts. Trilithium phosphide electrolytes in accordance with the present invention have displayed lithium ion conductivities greater than $10^{-4}(\Omega\cdot CM)^{-1}$ with negligible electronic conductivity and have proven to be electrochemically stable up to cell voltages of 1.98 volts (i.e., in a $Li-MoS_2$ battery operated at room temperature). The trilithium phosphide electrolyte of the present invention does not undergo structural modification under charge and discharge conditions and is believed to have a single phase hexagonal structure with a P6/mm space group. It can be simply made by either of the exothermic reactions between (1) lithium and phosphorous powder or (2) lithium and monolithium phosphide powder. Lithium batteries having solid-state, lithium phosphide electrolytes in accordance with the present invention and made using thin film technology are seen to be particularly useful in applications where miniaturization is important.

TESTS AND EXAMPLES

Metallic lithium was heated to 200° C. in a tantalum crucible inside a dry box filled with argon. Red phosphorus powder was successively added to the lithium melt in small amounts until a 50/50 atomic ratio mixture was obtained. The exothermic reaction raised the temperature of the reaction product to 400° C. The product was held at this temperature for two hours and then allowed to cool to room temperature. The product was then ground to a fine powder followed by heat treating at 400° C. for four hours which yielded monolithium phosphide (LiP) having needle shaped crystals and a black metallic luster. The LiP crystals were later ground and stored inside the dry box for analysis and subsequent further reaction with lithium.

The trilithium phosphide ($Li_3P$) electrolyte of the present invention, and used in the following tests, was synthesized in either of two ways, i.e., (1) through a reaction between lithium metal and phosphorus powder as above but in a 3:1::Li:P atomic ratio, or (2) through reaction of the previously made LiP with lithium melt. In this latter regard, lithium (1.4 g) was first melted in the dry box and 0.1 mole of powdered LiP slowly added thereto. In both cases the resulting trilithium phosphide reaction product was kept at 400° C. for four hours followed by cooling to room temperature. The $Li_3P$ was then ground to a fine powder and heat treated at 400° C. for four hours to yield a dark brown compound. The reaction between the Li melt and LiP powder is preferred as the direct reaction of Li and phosphorus is so highly exothermic that the reaction is difficult to control and some phosphorous is lost due to evaporation which results in the formation of a nonstoichiometric lithium phosphide compound.

Figure 2:
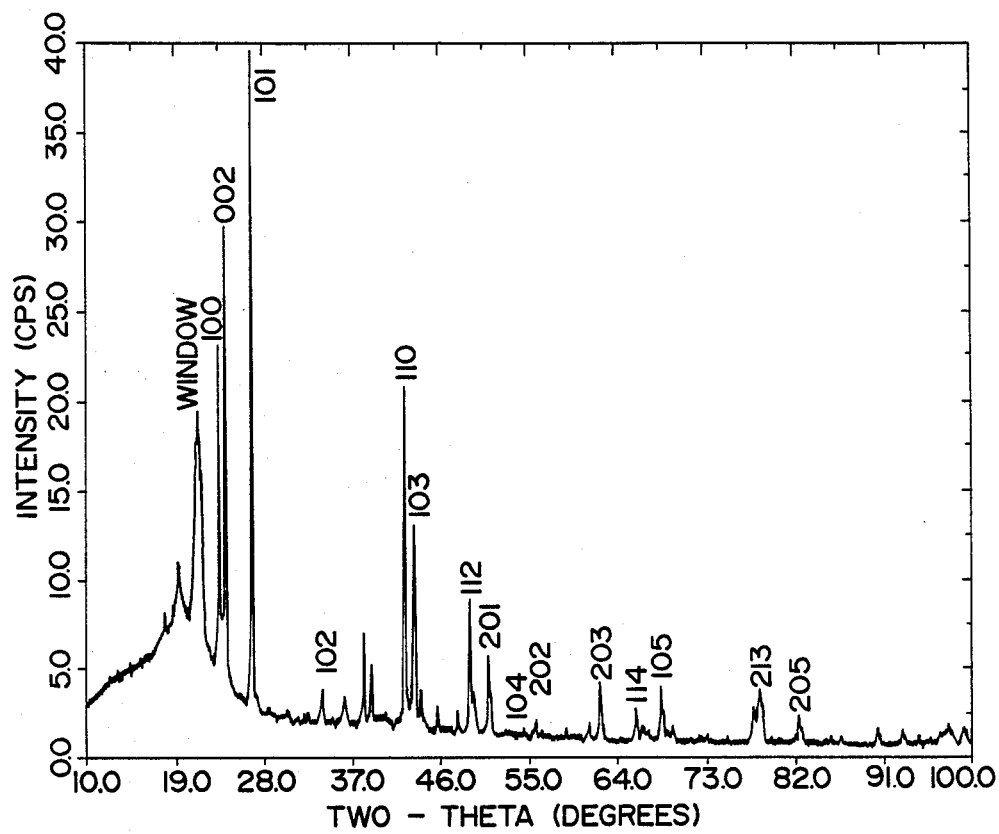
FIG. 2 is an X-ray diffraction pattern for the solid-state electrolyte of the present invention.

The trilithium phosphide prepared as above was next prepared for X-ray diffraction analysis by grinding to a fine powder and hot pressing to a test pellet in a zirconia die at 200° C. and 40,000 psi in an argon atmosphere. The pellets formed were encapsulated in a transfer cell designed to prevent exposure of the sample to the ambient and subsequently analyzed using a low ripple rotating copper anode X-ray generator (18KW) from Rigaku. A Siemens X-ray diffractometer in horizontal mode and Bragg-Brentano geometry was adopted to the Rigaku rotating anode. A position sensitive proportional counter was used as a detector in scan mode. The data were collected using Siemens software and analyzed using the procedure of Niggli wherein the crystal structure can be determined based on the presence or absence of a set of hkl reflections as described in M. J. Burger, *Contemporary Crystallography*, McGraw Hill Book Co., N.Y. (1970). The measured d-spacing values and the reflection intensity ratios determine the phase structure and the space group of the crystal. FIG. 2 shows the X-ray diffraction pattern obtained for the trilithium phosphide. The X-ray diffraction of the trilithium phosphide was found to best fit the hexagonal structure with P6/mm space group. Similar results also were obtained using Siemens software package for phase analysis. As a result, the $Li_3P$ is believed to have a layered structure consisting of Li(1), Li(2)P alternating layers. The bond length of Li-P in the plane of Li(2)P is longer than the Li-P in the direction of Li(1)-P-Li(1). In Cartesian coordinates, the phosphorus is located at (0,0,0), Li(1) at $(0,0,\frac{1}{2})$ and Li(2) at $(\frac{1}{3},\frac{2}{3},0)$ positions in the unit cell. The lattice parameters were refined as a=4.273A and C=7.594A using Siemens software. No change in lattice parameters was recognized for a pellet before and after sintering.

The impedance and conductivity of the trilithium phosphide was also measured. For the impedance test, a pellet of lithium phosphide was hot pressed as above, sandwiched between two lithium disks, encapsulated in a polypropylene cavity with two outlets for electrical connections, and the impedance measured. For the conductivity test, a lithium phosphide pellet (i.e., pressed at 40,000 psi and sintered for four hours at 400° C.) was sandwiched between two nickel disks placed in a boron nitride cell with spring contacts made to the nickel electrodes and heated over the range 23° C. to 500° C. Finally, electronic conductivity was measured using a nickel electrode as an ionically blocking electrode under DC bias in a cell where the sintered lithium phosphide pellet was sandwiched between a lithium electrode and a nickel electrode. A potentiostat and a wave generator were used for electrochemical measurement. The impedance of the cell was determined at zero bias potential between 10 mhz and 60 khz. The conductivity at low frequency (10 mhz) is $1.2 \times 10-4 \Omega^{-1} cm^{-1}$ which is an indication of the superionic conductivity of the trilithimm phosphide. The impedance tends to decrease at higher frequencies which is characteristic of solid-state ionic materials. The contact resistance between the $Li_3P$ and the electrodes was determined by measuring lithium phosphide pellets of several thicknesses, plotting the results and extrapolating the data to zero thickness. The contact resistance was negligible compared to the bulk resistivity at high temperature. The plot of log $\sigma$ vs 1/T obtained on a $Li_3P$ pellet, did not show any phase transition.

According to the Nernst-Einstein equation the following relationship exists, $$\sigma T = \sigma_o \exp(-\Delta H/RT)$$

and $$\ln \sigma = \ln \sigma_o - \ln T - \Delta H/RT$$

where $\Delta H$ is the enthalpy, loosely equated to the activation energy of ion jump from one site to another. The activation energy calculated from the slope of the plot was 18 kJ/mol (0.18 eV). The low activation energy of the $Li_3P$ indicates its high ionic conductivity and places it in the class of superionic conductors (i.e., materials which exhibit high ion mobility at room temperature). By way of comparison, the activation energy of lithium nitride (a known superionic conductor) has been reported to be 0.29–0.49 eV.

The current-voltage behavior of the trilithium phosphide between a lithium electrode and an ionically blocking electrode (nickel) was also determined. A high rate of lithium deposition on the nickel electrode at negative voltages was observed and the lithium phosphide behaved as a membrane for lithium ion transport. When the nickel electrode had a positive potential vs lithium a residual current was observed apparently due to the electronic conductivity of lithium phosphide, although a small part of the residual current is due to capacitive charging of the double layer. Under all conditions, the electronic conductivity of the lithium phosphide was negligible compared to the ionic conductivity. The current-voltage test also showed that the decomposition voltage of the lithium phosphide is above 1.8 V vs lithium.

The stability of the lithium phosphide electrolyte was also tested by reversible transport of lithium ion using a galvanostatic technique. The lithium phosphide pellet was sandwiched between two lithium electrodes and a constant current (10 μA) was applied. The sign of the applied current was changed each 60 minutes and the test continued for four days (100 cycles). In each cycle, lithium dissolved from one electrode and transported through the lithium phosphide and deposited on the other lithium electrode. No significant changes in the current-voltage response were observed during this experiment, which confirmed the stability of the lithium phosphide during ionic transport.

Figure 3:
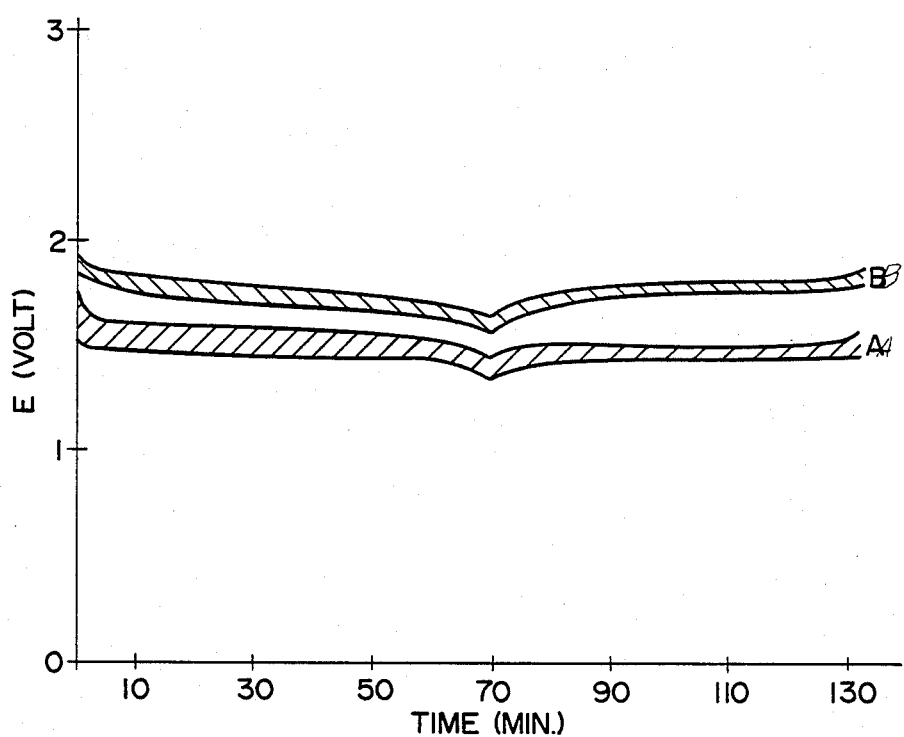
FIG. 3 is a voltage-time plot showing the charge-discharge performance of batteries made in accordance with the present invention.

Finally, batteries were made using titanium (VI) disulfide and molybdenum (VI) disulfide counter-electrodes in different test cells. The test cells were constructed essentially as illustrated in FIG. 1 wherein a layer of $Li_3P$ 1 is sandwiched between a lithium electrode 2 and a counter-electrode 3 (i.e., $TiS_2$ or $MoS_2$) which in turn is sandwiched between two nickel electrical contacts 4 and 5 held in a plastic housing 6. The electrodes and $Li_3P$ electrolyte had a diameter of 0.75 inches and thicknesses as follows:

Lithium electrode: 0.10 inches
Disulfide (Ti/Mo) electrode: 0.18 inches
$Li_3P$: 0.012 inches The Li-$TiS_2$ cell had an open circuit voltage of 2.74 volts and, upon six charge-discharge cycles at 50 microamps current, yielded a voltage-time plot in the band of curves labeled A in FIG. 3. The Li-$MoS_2$ cell had an open circuit voltage of 2.1 volts and, upon five charge-discharge cycles at 50 microamps current, yielded a voltage-time plot in the band of curves labeled B in FIG. 3. The cells were discharged for about 68 minutes (i.e., to the blips in the curves), recharged for about the same time and the cycle repeated several times to generate the bands A & B.

While the invention has been described in terms of specific embodiments thereof it is not intended to be limited thereto but rather only to the extent set forth in the claims which follows.

The embodiments of the invention in which an exclusive property or privilege is claimed are defined as follows:

1. A solid-state electrochemical cell comprising a lithium electrode, a counter-electrode electrochemically reactive with lithium and a solid electrolyte sandwiched between said electrode and counter-electrode said electrolyte comprising trilithium phosphide.

2. The cell as claimed in claim 1 wherein said counter-electrode is selected from the group consisting of titanium disulfide and molybdenum disulfide.

* * * * *